United States Patent [19]
Armstrong et al.

[11] Patent Number: 5,779,761
[45] Date of Patent: Jul. 14, 1998

[54] METHOD OF MAKING METALS AND OTHER ELEMENTS

[75] Inventors: Donn Reynolds Armstrong, Lisle; Stanley S. Borys, Naperville; Richard Paul Anderson, Clarendon Hills, all of Ill.

[73] Assignee: Kroftt-Brakston International, Inc., Clarendon Hills, Ill.

[21] Appl. No.: 691,423

[22] Filed: Aug. 2, 1996

Related U.S. Application Data

[63] Continuation of Ser. No. 283,358, Aug. 1, 1994, abandoned.

[51] Int. Cl.⁶ .......................... C22B 21/04; C22B 30/02; C22B 34/10; C22B 34/20
[52] U.S. Cl. .................. 75/370; 75/371; 75/605; 75/613; 75/616; 75/619; 75/620; 75/676
[58] Field of Search ................ 75/10.28, 408, 75/589, 605, 613, 616, 619, 620, 676, 745, 370, 371

[56] References Cited

U.S. PATENT DOCUMENTS

| | | | |
|---|---|---|---|
| 2,205,854 | 6/1940 | Kroll | 75/84 |
| 2,846,303 | 8/1953 | Keller et al. | 75/84.5 |
| 2,846,304 | 8/1958 | Keller et al. | 75/84.5 |
| 2,882,143 | 4/1959 | Schmidt et al. | 75/84.5 |
| 2,890,112 | 6/1959 | Winter, Jr. | 75/84.5 |
| 2,941,867 | 6/1960 | Maurer | 23/223.5 |
| 2,944,888 | 7/1960 | Quin et al. | 75/84.5 |
| 3,058,820 | 10/1962 | Whitehurst | 75/10 |
| 3,067,025 | 12/1962 | Chisholm | 75/84.5 |
| 3,519,258 | 7/1970 | Ishizuka | 266/34 |
| 3,535,109 | 10/1970 | Ingersoll | 75/84.4 |
| 3,825,415 | 7/1974 | Johnston et al. | 75/84.5 |
| 3,847,596 | 11/1974 | Holland et al. | 75/84.4 |
| 3,966,460 | 6/1976 | Spink | 75/84.4 |
| 4,401,467 | 8/1983 | Jordan | 420/417 |
| 4,445,931 | 5/1984 | Worthington | 75/0.5 B |
| 4,518,426 | 5/1985 | Murphy | 75/112 |
| 4,521,281 | 6/1985 | Kadija | 204/25 |
| 4,556,420 | 12/1985 | Evans | 75/84.5 |
| 4,687,632 | 8/1987 | Hurd et al. | 419/45 |
| 4,725,312 | 2/1988 | Seon et al. | 75/84.5 |
| 4,830,665 | 5/1989 | Winand | 75/10.19 |
| 4,877,445 | 10/1989 | Okudaira et al. | 75/0.5 B |
| 4,897,116 | 1/1990 | Scheel | 75/84.4 |
| 4,902,341 | 2/1990 | Okudaira et al. | 75/10.18 |
| 4,923,577 | 5/1990 | McLaughlin et al. | 204/64 |
| 4,985,069 | 1/1991 | Traut | 75/10.18 |
| 5,032,176 | 7/1991 | Kametani et al. | 75/343 |
| 5,259,862 | 11/1993 | White et al. | 75/363 |
| 5,460,642 | 10/1995 | Leland | 75/617 |

OTHER PUBLICATIONS

Metallurgical Transactions B, vol. 18B, No. 1, Process Metallurgy, Mar. 1987, pp. 511–517.

Primary Examiner—Kathryn L. Gorgos
Assistant Examiner—Chrisman D. Carroll
Attorney, Agent, or Firm—Emrich & Dithmar

[57] ABSTRACT

A method of producing a non-metal element or a metal or an alloy thereof from a halide or mixtures thereof. The halide or mixtures thereof are contacted with a stream of liquid alkali metal or alkaline earth metal or mixtures thereof in sufficient quantity to convert the halide to the non-metal or the metal or alloy and to maintain the temperature of the reactants at a temperature lower than the lesser of the boiling point of the alkali or alkaline earth metal at atmospheric pressure or the sintering temperature of the produced non-metal or metal or alloy. A continuous method is disclosed, particularly applicable to titanium.

41 Claims, 4 Drawing Sheets

PROCESS FLOW DIAGRAM

PROCESS FLOW DIAGRAM

LOW TEMPERATURE PROCESS
BASIS = CRITICAL FLOW THROUGH 5 mm NOZZLE

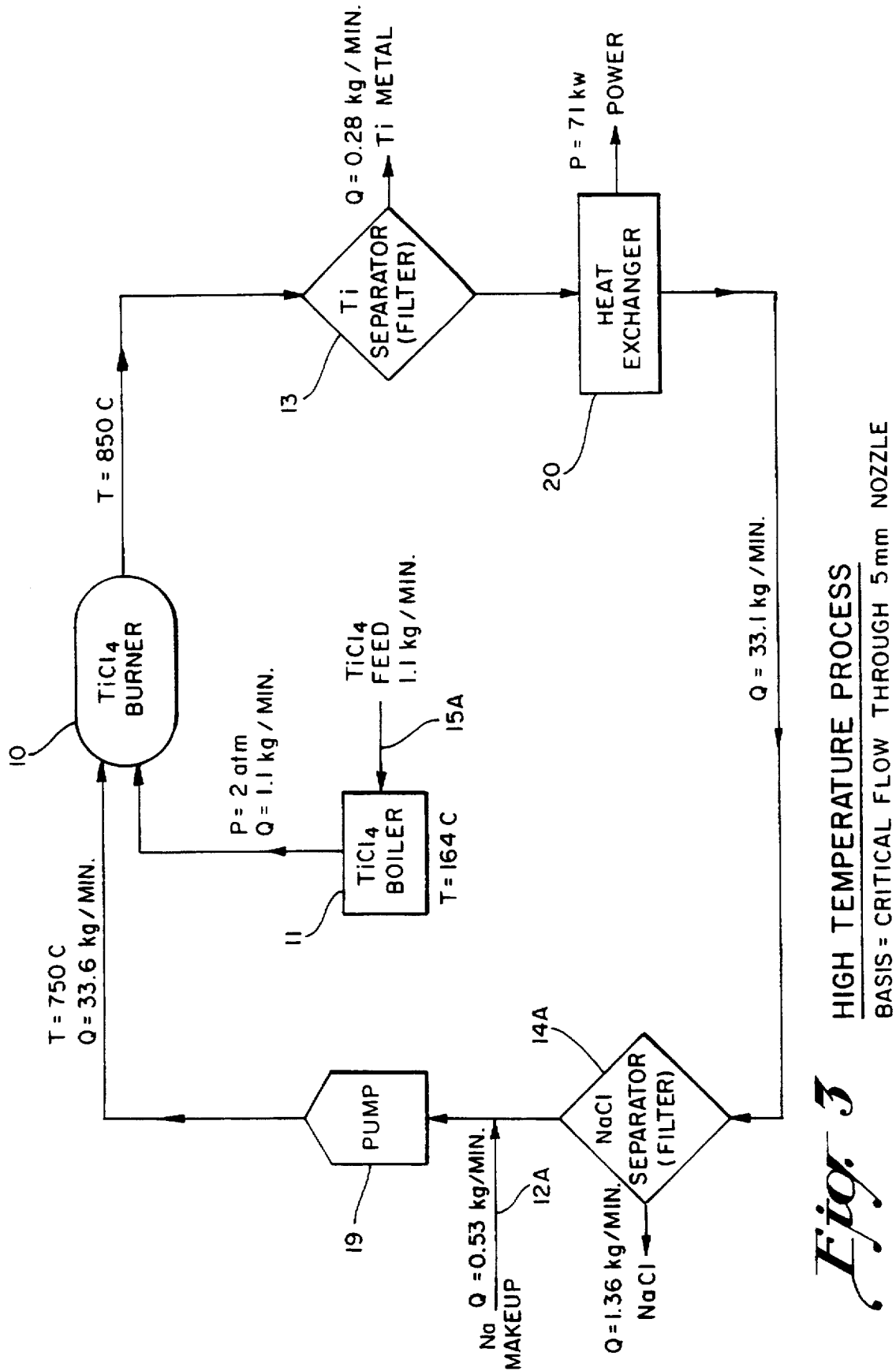
Fig. 3 HIGH TEMPERATURE PROCESS
BASIS = CRITICAL FLOW THROUGH 5mm NOZZLE

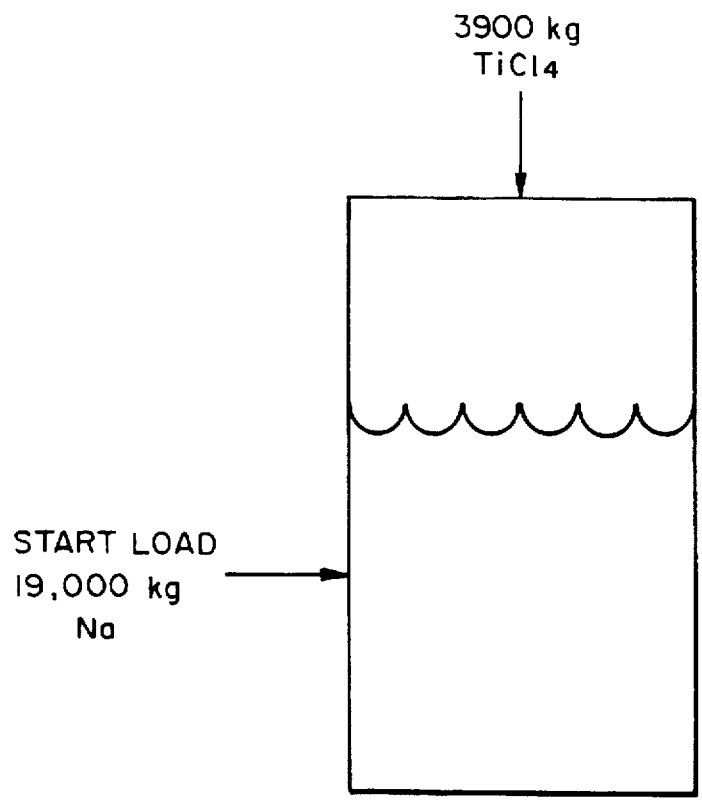
Fig. 4   BATCH PROCESS
BASIS = 150 mtpy (SAME AS CONTINUOUS PROCESS)

METHOD OF MAKING METALS AND OTHER ELEMENTS

This is a file wrapper continuation of application Ser. No. 08/283,358, filed Aug. 1, 1994, now abandoned.

BACKGROUND OF THE INVENTION

This invention relates to the production of elemental material from the halides thereof and has particular applicability to those metals and non-metals for which the reduction of the halide to the element is exothermic. Particular interest exists for titanium and the present invention will be described with particular reference to titanium but is applicable to other metals and non-metals such as Al, As, Sb, Be, B, Ta, Ge, V, Nb, Mo, Ga, Ir, Os, U and Re, all of which produce significant heat upon reduction from the halide to the metal. For the purposes of this application, elemental materials include those metals and non-metals listed above or in Table 1.

At present titanium production is by reduction of titanium tetrachloride, which is made by chlorinating relatively high-grade titanium dioxide ore. Ores containing rutile can be physically concentrated to produce a satisfactory chlorination feed material; other sources of titanium dioxide, such as ilmenite, titaniferous iron ores and most other titanium source materials, require chemical beneficiation.

The reduction of titanium tetrachloride to metal has been attempted using a number of reducing agents including hydrogen, carbon, sodium, calcium, aluminum and magnesium. The magnesium reduction of titanium tetrachloride has proved to be a commercial method for producing titanium metal. However, the resultant batch process requires significant material handling with resulting opportunities for contamination and also in quality variation from batch to batch. The greatest potential for decreasing production cost is the development of a continuous reduction process with attendant reduction in material handling.

There is a strong demand for the development of a process that enables continuous economical production of titanium powder suitable for use without additional processing for application to powder metallurgy or vacuum-arc melting to ingot form. The Kroll process and the Hunter process are the two present day methods of producing titanium commercially.

In the Kroll process, titanium tetrachloride is chemically reduced by magnesium at about 1000° C. The process is conducted in a batch fashion in a metal retort with an inert atmosphere, either helium or argon. Magnesium is charged into the vessel and heated to prepare a molten magnesium bath. Liquid titanium tetrachloride at room temperature is dispersed dropwise above the molten magnesium bath. The liquid titanium tetrachloride vaporizes in the gaseous zone above the molten magnesium bath. A surface reaction occurs to form titanium and magnesium chloride. The Hunter process is similar to the Kroll process, but uses sodium instead of magnesium to reduce the titanium tetrachloride to titanium metal and produce sodium chloride.

For both processes, the reaction is uncontrolled and sporadic and promotes the growth of dendritic titanium metal. The titanium fuses into a mass that encapsulates some of the molten magnesium (or sodium) chloride. This fused mass is called titanium sponge. After cooling of the metal retort, the solidified titanium sponge metal is broken up, crushed, purified and then dried in a stream of hot nitrogen. Powder titanium is usually produced through grinding, shot casting or centrifugal processes. A common technique is to first cause the titanium to absorb hydrogen to make the sponge brittle to facilitate the grinding process. After formation of the powder titanium hydride, the particles are dehydrogentated to produce a usable product. The processing of the titanium sponge into a usable form is difficult, labor intensive, and increases the product cost by a factor of two to three.

During these processing steps, some sponge particles as large as several centimeters in size may be ignited in air and are thereby converted to titanium oxynitride, which is usually not destroyed during the melting operation. The resulting inclusions of hard material within the titanium metal parts have been identified as causing disastrous failures of jet engine parts, leading to crashes of aircraft.

The processes discussed above have several intrinsic problems that contribute heavily to the high cost of titanium production. Batch process production is inherently capital and labor intensive. Titanium sponge requires substantial additional processing to produce titanium in a usable form, increasing cost, increasing hazard to workers and exacerbating batch quality control difficulties. Neither process utilizes the large exothermic energy reaction, requiring substantial energy input for titanium production (approximately 6 kw-hr/kg product metal). In addition, the processes generate significant production wastes that are of environmental concern.

SUMMARY OF THE INVENTION

Accordingly, an object of the present invention is to provide a method and system for producing non-metals or metals or alloys thereof which is continuous having significant capital and operating costs advantages over existing batch technologies.

Another object of the present invention is to provide a method and system for producing metals and non-metals from the exothermic reduction of the halide while preventing the metal or non-metal from sintering onto the apparatus used to produce same.

Still another object of the invention is to provide a method and system for producing non-metal or metal from the halides thereof wherein the process and system recycles the reducing agent, thereby substantially reducing the environmental impact of the process.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is an energy balance for a process in which the reactants exits the burner at about 850° C.; and FIG. 4 is a schematic representation of a batch process.

DETAILED DESCRIPTION OF THE INVENTION

The process of the invention may be practiced with the use of any alkaline or alkaline earth metal depending upon the transition metal to be reduced. In some cases, combinations of an alkali or alkaline earth metals may be used. Moreover, any halide or combinations of halides may used with the present invention although in most circumstances chlorine, being the cheapest and most readily available, is preferred of the alkali or alkaline earth metals, by way of example, sodium will be chosen not for purposes of limitation but merely purposes of illustration, because it is cheapest and preferred, as has chlorine been chosen for the same purpose.

Regarding the non-metals or metals to be reduced, it is possible to reduce a single metal such as titanium or tantalum or zirconium, selected from the list set forth hereafter. It is also possible to make alloys of a predetermined composition by providing mixed metal halides at the beginning of the process in the required molecular ratio. By way of example, Table 1 sets forth heats of reaction per gram of sodium for the reduction of non-metal or metal halides applicable to the inventive process.

TABLE 1

| FEEDSTOCK | HEAT kJ/g |
| --- | --- |
| $TiCl_4$ | 10 |
| $AlCL_3$ | 9 |
| $SbCl_3$ | 14 |
| $BeCl_2$ | 10 |
| $BCl_3$ | 12 |
| $TaCl_5$ | 11 |
| $VCl_4$ | 12 |
| $NbCl_5$ | 12 |
| $MoCl_4$ | 14 |
| $GaCl_3$ | 11 |
| $UF_6$ | 10 |
| $ReF_6$ | 17 |

The process will be illustrated, again for purposes of illustration and not for limitation, with a single metal titanium being produced from the tetrachloride.

Figure 1:
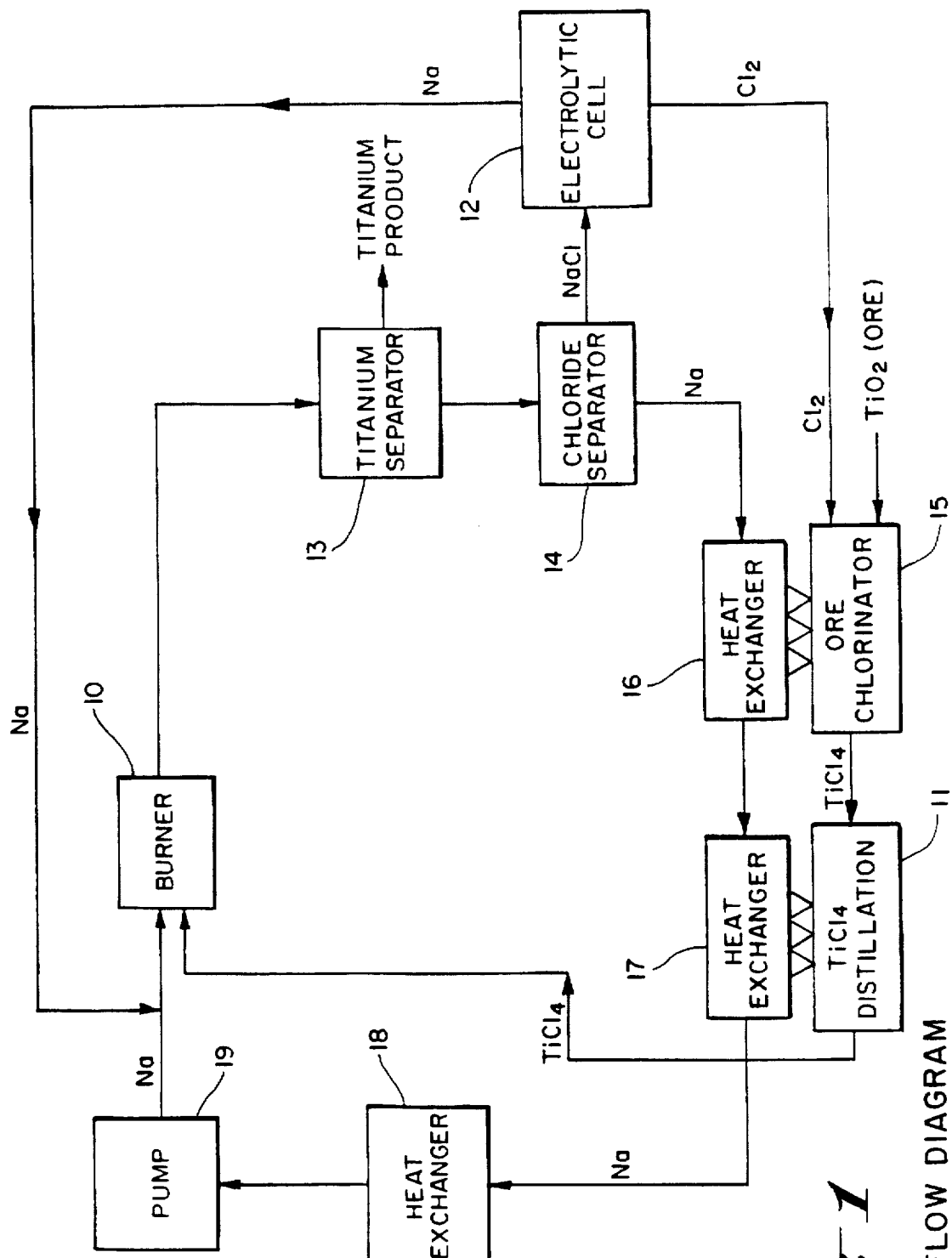
FIG. 1 is a process flow diagram showing the continuous process for producing as an example titanium metal from titanium tetrachloride.

A summary process flowsheet is shown in FIG. 1. Sodium and titanium tetrachloride are combined in a burner reaction chamber 10 where titanium tetrachloride vapor from a source thereof in the form of a distillation column 11 is injected into a flowing sodium stream from a source (not shown) thereof. Make up sodium is produced in an electrolytic cell 12. The reduction reaction is highly exothermic, forming molten reaction products of titanium and sodium chloride. The molten reaction products are quenched in the bulk sodium stream. Particle sizes and reaction rates are controlled by metering of the titanium tetrachloride vapor flowrate, dilution of the titanium tetrachloride vapor with an inert gas, such as He or Ar, and the sodium flow characteristics and mixing parameters where the burner includes concentric nozzles having an inner nozzle for the $TiCl_4$ and the outer nozzle for the liquid sodium, the gas is intimately mixed with the liquid and the resultant temperature, significantly affected by the heat of reaction, can be controlled by the quantity of sodium and maintained below the sintering temperature of the produced metal, such as titanium or about 1000° C.

The bulk sodium stream then contains the titanium and sodium chloride reaction products. These reaction products are removed from the bulk sodium stream by conventional separators 13 and 14 such as cyclones or particulate filters.

Two separate options for separation of the titanium and the sodium chloride exist.

The first option removes the titanium and sodium chloride products in separate steps. This is accomplished by maintaining the bulk stream temperature such that the titanium is solid but the sodium chloride is molten through control of the ratio of titanium tetrachloride and sodium flowrates to the burner 10. For this option, the titanium is removed first, the bulk stream cooled to solidify the sodium chloride, then the sodium chloride is removed from separator 14. In this option, the process heat for titanium tetrachloride distillation would be removed from the bulk stream immediately after the titanium separator 13.

In the second option for reaction product removal, a lower ratio of titanium tetrachloride to sodium flowrate would be maintained in the burner 10 so that the bulk sodium temperature would remain below the sodium chloride solidification temperature. For this option, titanium and sodium chloride would be removed simultaneously. The sodium chloride and any residual sodium present on the particles would then be removed in a water-alcohol wash.

Following separation, the sodium chloride is then recycled to the electrolytic cell 12 to be regenerated. The sodium is returned to the bulk process stream for introduction to burner 10 and the chlorine is used in the ore chlorinator 15. It is important to note that while both electrolysis of sodium chloride and subsequent ore chlorination will be performed using technology well known in the art such integration and recycle of the reaction byproduct is not possible with the Kroll or Hunter process because of the batch nature of those processes and the production of titanium sponge as an intermediate product. Operators of the Kroll and Hunter processes purchase titanium tetrachloride for use in the manufacture of titanium. The integration of these separate processes enabled by the inventive chemical manufacturing process has significant benefits with respect to both improved economy of operation and substantially reduced environmental impact achieved by recycle of waste streams.

Chlorine from the electrolytic cell 12 is used to chlorinate titanium ore (rutile, anatase or ilmenite) in the chlorinator 15. In the chlorination stage, the titanium ore is blended with coke and chemically converted in the presence of chlorine in a fluidized-bed or other suitable kiln chlorinator 15. The titanium dioxide contained in the raw material reacts to form titanium tetrachloride, while the oxygen forms carbon dioxide with the coke. Iron and other impurity metals present in the ore are also converted during chlorination to their corresponding chlorides. The titanium chloride is then condensed and purified by means of distillation in column 11. With current practice, the purified titanium chloride vapor would be condensed again and sold to titanium manufacturers; however, in this integrated process, the titanium tetrachloride vapor stream is used directly in the manufacturing process.

After providing process heat for the distillation step in heat exchanger 16, the temperature of the bulk process stream is adjusted to the desired temperature for the burner 10 at heat exchanger 17, and then combined with the regenerated sodium recycle stream, and injected into the burner. It should be understood that various pumps, filters, traps, monitors and the like will be added as needed by those skilled in the art.

Figure 2:
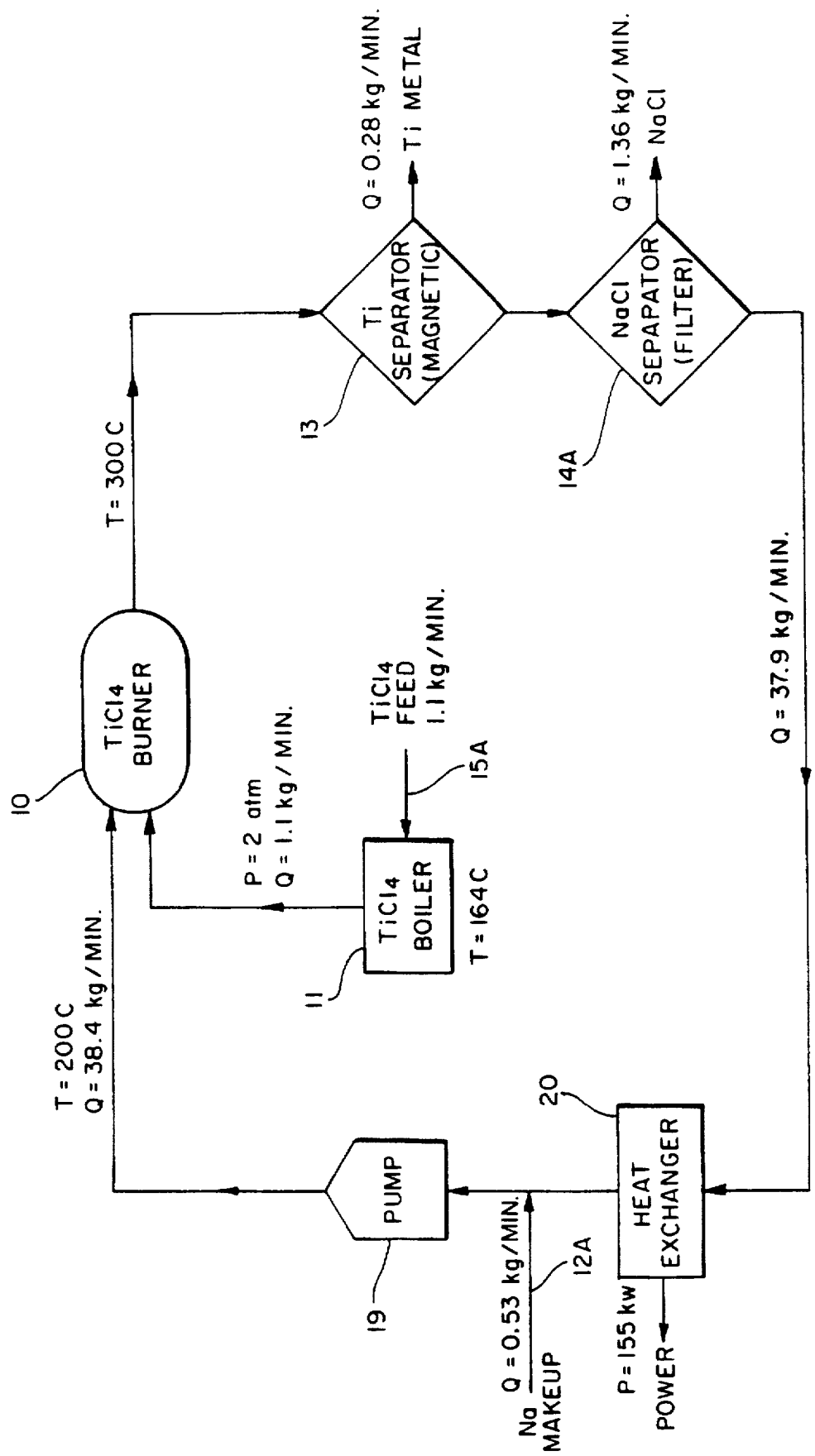
FIG. 2 is a heat balance flow sheet for a process wherein the reactants exiting the burner are about 300° C.

Referring now to FIGS. 2 and 3, there is disclosed flow diagrams, respectively, for a low temperature process in FIG. 2 and a high temperature process in FIG. 3. The principal differences are the temperatures at which the sodium enters and leaves the burner 10. Like numbers have been applied for like equipment, the purpose of which was explained in FIG. 1. For instance in FIG. 2 for the low temperature process, the sodium entering the burner 10 is at 200° C. having a flow rate of 38.4 kilograms per minute. The titanium tetrachloride from the boiler 11 is at 2 atmospheres and at a temperature of 164° C., the flow rate through line 15a being 1.1 kg/min. Pressures up to 12 atmospheres may be used, but it is important that back flow be prevented, so an elevated at pressure of at least 2 atmospheres is preferred to ensure that flow through the burner nozzle is critical or choked. Another way of expressing the pressure required to prevent back flow is that the halide vapor flow must be at sonic velocity. In all aspects, for the process of FIGS. 1 as well as the processes of FIGS. 2 and 3, it is important that the titanium that is removed from the separator 13 be at or below and preferably just below the sintering temperature of titanium in order to preclude and prevent the solidification of the titanium on the surfaces of the equipment, which is one of the fundamental difficulties with the processes commercially used presently. By maintaining the temperature of the titanium metal below the sintering temperature of titanium metal, the titanium will not attach to the walls of the equipment as it presently does and, therefore, the physical removal of same will be obviated. This is an important aspect of this invention and is obtained by the use of sufficient Na metal or diluent gas or both to control the temperature of the elemental (or alloy) product.

By way of interest, batch processes now in use, shown in FIG. 4, require that the titanium sponge be jackhammered from the collection vessel and considering the hardness of the sponge, is no mean task.

The high-temperature process illustrated in FIG. 3 shows that the temperature at which the sodium enters the boiler is at 750°, having a flow rate of about 33.4 kg.

The temperature of product from the burner in the low temperature process of FIG. 2 is about 300° C. whereas the high temperature process is at about 850° C. It is clear that even at the high temperature process, the titanium is well below the sintering temperature which is approximately 1000° C., thereby ensuring that the shortcomings of the present day process are avoided. The heat exchangers in both FIGS. 2 and 3 are identified by the numeral 20 although the values of the power removed is different for the processes of FIG. 2 (low temperature) and FIG. 3 (high temperature), due in part because of the placement of the heat exchanger 20 in the high temperature process prior to the separation of sodium chloride while in the low temperature process, the heat exchanger 20 is subsequent to the separation of sodium chloride resulting in different power outputs as indicated. In both flow diagrams of FIGS. 2 and 3, sodium make-up is indicated by the line 12A and this may come from an electrolytic cell 12 or some other source of sodium entirely different. In other aspects, both FIGS. 2 and 3 are illustrative of the types of design parameters which may be used to produce titanium metal in a continuous process which avoids the problems inherent in the batch process presently in use commercially.

The invention has been illustrated by reference to titanium alone and titanium tetrachloride as a feedstock, in combination with sodium as the reducing metal. However, it should be understood that the foregoing was for illustrative purposes only and the invention clearly pertains to those metals and non-metals in Table 1, which of course include the fluorides of uranium and rhenium and well as other halides such as bromides. Moreover, sodium while being the preferred reducing metal because of cost and availability, is clearly not the only available reductant. Lithium, potassium as well as calcium and other alkaline earth metals are available and thermodynamically feasible. It is well within the skill of the art to determine from the thermodynamic Tables which metals are capable of acting as a reducing agent in the foregoing reactions, the principal applications of the process being to those reactions which are highly exothermic as illustrated in Table 1 when the chloride or halide is reduced to the metal. Moreover, it is well within the skill of the art and it is contemplated in this invention that alloys can be made by the process of the subject invention by providing a suitable halide feed in the molecular ratio of the desired alloy.

While there has been disclosed what is considered to be the preferred embodiment of the present invention, it is understood that various changes in the details may be made without departing from the spirit, or sacrificing any of the advantages of the present invention.

We claim:

1. A method of producing an elemental material or an alloy thereof from a halide vapor of the elemental material or mixtures thereof comprising submerging the halide vapor or mixtures thereof in flowing liquid alkali metal or liquid alkaline earth metal or mixtures thereof to convert the halide vapor to elemental material or an alloy.

2. The method of claim 1, wherein the elemental material is one or more of Ti, Al, Sb, Be, B, Ga, Mo, Nb, Ta, Zr, and V.

3. The method of claim 1, wherein the elemental material is one or more of Ir, Os, Re and U.

4. The method of claim 1, wherein the elemental material or alloy produced does not sinter.

5. The method of claim 1, wherein the halide vapor or mixtures thereof is submerged in liquid alkali metal or liquid alkaline earth metal or mixtures thereof by introducing the halide vapor into the liquid through a submerged injector.

6. The method of claim 5, wherein the injector is a nozzle.

7. The method of claim 1, wherein the conversion of the halide vapor to elemental material or an alloy is exothermic.

8. The method of claim 7, wherein the alkali metal is one or more of Na, K and Li.

9. The method of claim 7, wherein the alkaline earth metal is one or more of Ca, Sr and Ba.

10. The method of claim 7, wherein the halide is one or more of Cl, Br and F.

11. The method of claim 7, wherein the alkali metal is one or more of Na and K, the alkaline earth metal is one or more of Ca and Ba and the halide is one or more of Cl and Br.

12. The method of claim 7, wherein the halide vapor is supplied at a pressure sufficient to maintain sonic flow.

13. The method of claim 7, and further comprising adding a inert gas to the halide vapor.

14. The method of claim 13, wherein the inert gas is Ar or He.

15. A method of continuously producing a non-metal or a metal or an alloy thereof comprising, providing a supply of halide vapor of the metal or non-metal or mixtures thereof, providing a supply of flowing liquid alkali or alkaline earth metal or mixtures thereof, introducing the halide vapor submerged in the flowing liquid alkali metal or alkaline earth metal or mixtures thereof to produce a powder of a non-metal or a metal or an alloy thereof and a halide of the alkali or alkaline earth metal, separating the powder from the reactants, separating the alkali metal halide or the alkaline earth metal halide into its constituent parts, cooling and recycling the alkali metal or the alkaline earth metal to react with additional halide vapor.

16. The method of claim 15, wherein the reduction of halide to metal or non-metal is exothermic.

17. The method of claim 16, wherein the halide has a boiling point less than about 400° C.

18. The method of claim 17, wherein the halide vapor flows through the inner nozzle of concentric nozzles with the liquid alkali or alkaline earth metal flowing through the annulus formed by inner and outer nozzles, the vapor flow being sonic.

19. The method of claim 18, wherein the halide vapor is one or more of $TiCl_4$, $VCl_4$, $NbCl_5$, $MoCl_4$, $GaCl_3$, $UF_6$, $ReF_6$.

20. The method of claim 15, wherein the halide is one or more of Br and Cl.

21. The method of claim 15, wherein the reaction takes place in equipment suitable therefor and there is an excess of the alkaline metal or alkaline earth metal over the stoichiometric quantity needed to react with the halide vapor such that the temperature of the powder of the non-metal or metal or alloy produced is controlled to prevent the powder from depositing on the equipment.

22. The method of claim 15, wherein the reaction takes place in equipment suitable therefor and the temperature of the reactants is maintained low enough that the elemental metal or alloy reaction products is quenched by contact with the alkali metal or alkaline earth metal.

23. The method of claim 15, and further comprising contacting the halide obtained from separating the alkali metal halide or alkaline earth metal halide into its constituent parts with ore of the elemental metal or alloy.

24. A method of producing an elemental material or alloys thereof selected from the class consisting of Ti, Al, Sb, Be, B, Ga, Mo, Nb, Ta, Zr, and V from a vapor halide of the elemental material or mixtures of the elemental materials comprising introducing the vapor halide or mixtures thereof by submerged injection into liquid alkali or alkali earth metal or mixtures thereof at a velocity not less than the sonic velocity of the halide vapor, the liquid alkali or alkaline earth metal or mixtures thereof being present in sufficient quantity to convert the halide vapor or mixtures thereof to elemental material or an alloy thereof.

25. The method of claim 24, wherein the elemental material or alloy is produced in a continuous process.

26. The method of claim 24, wherein the halide is $TiCl_4$, the alkali metal is Na and the temperature of the liquid Na away from where the halide vapor is introduced is maintained in the range of from about 200° C. to about 400° C.

27. The method of claim 26, wherein the liquid Na is present in sufficient excess to quench Ti powder upon production thereof to reduce the temperature of the Ti powder below the sintering temperature of Ti.

28. A method of producing Ti powder from a source of $TiCl_4$ vapor, comprising introducing the $TiCl_4$ vapor at a velocity not less than the sonic velocity of the vapor submerged in liquid Na to produce Ti powder and separating the Ti powder from the liquid Na.

29. The method of claim 28, wherein the liquid Na is maintained at a temperature in the range of from about 200° C. to about 400° C. except where the $TiCl_4$ reacts with the liquid Na.

30. The method of claim 28, wherein the Ti powder produced has a mean average diameter of about 5 microns.

31. A method of continuously producing a non-metal or a metal or an alloy thereof comprising, providing a supply of halide vapor of the metal or non-metal or mixtures thereof, providing a supply of liquid alkali or alkaline earth metal or mixtures thereof, introducing the halide vapor submerged in the liquid alkali metal or alkaline earth metal or mixtures thereof at a velocity equal to or greater than the sonic velocity of the halide vapor to produce a powder of a non-metal or a metal or an alloy thereof and a halide of the alkali or alkaline earth metal, said alkali or alkaline earth metal being present in sufficient quantities in excess of the stoichiometric quantity necessary for reducing the halide vapor for quenching the reaction products below the sintering temperature of the non-metal or metal or alloy thereof, recovering heat from the excess alkali or alkaline earth metal, separating the alkali metal halide or the alkaline earth metal halide into its constituent parts, recycling the alkali metal or the alkaline earth metal for reaction with additional halide vapor, and recycling halogen vapor for reaction with ore of the metal or non-metal.

32. The method of claim 31, wherein the halide is the chloride of one or more of Ti or Zr.

33. The method of claim 32, wherein the alkali or alkaline earth metal is Na or Mg.

34. The method of claim 33, wherein the alkali or alkaline earth metal is present as a flowing stream and the chloride vapor is introduced by injection thereinto.

35. The method of claim 34, wherein at least some of the recovered heat is used for power generation.

36. The method of claim 31, wherein the halide is $TiCi_4$ and the alkali or alkaline earth metal is Na.

37. A method of producing Ti powder from a source of $TiCl_4$ vapor, comprising introducing the $TiCl_4$ vapor submerged in a flowing stream of liquid Na to produce Ti powder and separating the Ti powder from the liquid Na.

38. The method of claim 37, wherein the Ti powder has a particle diameter in the range of from about 1 to about 10 microns.

39. The method of claim 37, wherein the $TiCl_4$ vapor is introduced into the flowing stream of liquid Na by injection.

40. The method of claim 37, wherein the $TiCl_4$ vapor is introduced at sonic velocity into the flowing Na stream.

41. The method of claim 37, wherein the flowing stream of Na is present in excess over the stoichiometric quantity needed to react with the $TiCl_4$ vapor such that the Ti powder produced does not sinter.

* * * * *